(12) United States Patent  
Kidman

(10) Patent No.: US 7,611,364 B2
(45) Date of Patent: Nov. 3, 2009

(54) WIDE SAFETY STRAP FOR ELECTRICAL FIXTURES

(76) Inventor: Brent L. Kidman, 486 E. Southfield Rd., Spanish Fork, UT (US) 84660

( * ) Notice: Subject to any disclaimer, the term of this patent is extended or adjusted under 35 U.S.C. 154(b) by 0 days.

(21) Appl. No.: 12/014,061

(22) Filed: Jan. 14, 2008

(65) Prior Publication Data

US 2008/0113535 A1    May 15, 2008

Related U.S. Application Data

(63) Continuation of application No. 11/605,721, filed on Nov. 29, 2006, now Pat. No. 7,318,732, which is a continuation of application No. 11/328,650, filed on Jan. 10, 2006, now Pat. No. 7,284,996.

(60) Provisional application No. 60/643,018, filed on Jan. 11, 2005, provisional application No. 60/674,499, filed on Apr. 25, 2005, provisional application No. 60/697,913, filed on Jul. 7, 2005.

(51) Int. Cl.  
    *H01R 13/44* (2006.01)

(52) U.S. Cl. ............................ 439/136; 439/535; 174/66

(58) Field of Classification Search ................. 439/136, 439/535, 536; 174/66; D13/177  
See application file for complete search history.

(56) References Cited

U.S. PATENT DOCUMENTS

| | | | |
|---|---|---|---|
| 1,726,429 A | 8/1929 | Ferris | |
| 1,785,463 A | 12/1930 | Strongson | |
| 2,740,873 A * | 4/1956 | Cronk | 200/295 |
| 2,860,317 A | 11/1958 | Johnson | |
| 2,920,303 A | 1/1960 | Johnson | |
| 3,437,737 A | 4/1969 | Wagner | |
| 3,735,020 A * | 5/1973 | Licata | 174/66 |
| 3,908,235 A * | 9/1975 | Telliard et al. | 411/508 |
| 3,953,933 A * | 5/1976 | Goldstein | 40/642.02 |
| 4,500,746 A | 2/1985 | Meehan | |
| 4,631,354 A * | 12/1986 | Boteler | 174/66 |
| 4,835,343 A * | 5/1989 | Graef et al. | 174/66 |
| 5,073,681 A | 12/1991 | Hubben et al. | |
| 5,153,816 A | 10/1992 | Griffin | |
| 5,180,886 A | 1/1993 | Dierenbach et al. | |
| 5,189,259 A | 2/1993 | Carson et al. | |
| 5,223,673 A | 6/1993 | Mason | |

(Continued)

OTHER PUBLICATIONS

Entratech Systems, "Infoplate recessed wall outlet system, designed for appealing aesthetics and versatile function," http://www.entratechsystems.com/infoplate.html, Apr. 11, 2003, pp. 1-4.

(Continued)

*Primary Examiner*—Hae Moon Hyeon  
(74) *Attorney, Agent, or Firm*—Pate Pierce & Baird

(57) ABSTRACT

An electrical fixture having a front side and a back side and defining longitudinal, lateral, and transverse directions substantially orthogonal to one another. The electrical fixture may include a body, a flange, and at least one anchor. The body may have at least one terminal extending laterally to the exterior thereof. The flange may extend laterally and longitudinally from the body to substantially preclude transverse access to the terminal from the front side of the electrical fixture. The at least one anchor may transversely extend from the flange to provide securement with a connection box.

16 Claims, 12 Drawing Sheets

U.S. PATENT DOCUMENTS

| | | | |
|---|---|---|---|
| 5,456,373 A * | 10/1995 | Ford | 220/242 |
| 5,477,010 A | 12/1995 | Buckshaw et al. | |
| 5,623,124 A | 4/1997 | Chien | |
| 5,675,125 A * | 10/1997 | Hollinger | 174/66 |
| 5,723,817 A | 3/1998 | Arenas et al. | |
| 6,005,308 A | 12/1999 | Bryde et al. | |
| 6,109,937 A | 8/2000 | Bonilla | |
| 6,147,304 A | 11/2000 | Doherty | |
| 6,376,770 B1 | 4/2002 | Hyde | |
| 6,410,850 B1 | 6/2002 | Abel et al. | |
| 6,609,927 B2 | 8/2003 | Kidman | |
| 6,765,149 B1 * | 7/2004 | Ku | 174/66 |
| 6,875,940 B2 * | 4/2005 | Endres et al. | 200/339 |
| 6,949,708 B1 * | 9/2005 | Hausen et al. | 174/66 |
| 6,974,910 B2 * | 12/2005 | Rohmer | 174/66 |
| 7,071,414 B2 | 7/2006 | Kim | |

OTHER PUBLICATIONS

Entratech Systems, "Instructions and Specifications," Infoplate plus, Sandusky, Ohio; 2001, pp. 1-2.

Leviton, "Decora Plus Snap-On Wallplates," http://www.leviton.com/sections/prodinfo/decora/sheets/s5c7p9.htm, Jun. 7, 2001, pp. 1-2.

Hubbell, "Self Contained Wiring Devices," Wirecon Installation Guide, location unknown, 2000, pp. 1-20.

Pass and Seymour Legrand, "Self Contained Devices," 2005, p. 1-6.

* cited by examiner

WIDE SAFETY STRAP FOR ELECTRICAL FIXTURES

RELATED APPLICATIONS

This application is a continuation of U.S. patent application Ser. No. 11/605,721 filed Nov. 29, 2006 now U.S. Pat. No. 7,318,732 which is a continuation of U.S. patent application Ser. No. 11/328,650 filed Jan. 10, 2006 now U.S. Pat. No. 7,284,996, which claims the benefit of: 1) U.S. Provisional Patent Application Ser. No. 60/643,018 filed Jan. 11, 2005; 2) U.S. Provisional Patent Application Ser. No. 60/674,499 filed Apr. 25, 2005; and 3) U.S. Provisional Patent Application Ser. No. 60/697,913 filed Jul. 7, 2005.

BACKGROUND

1. The Field of the Invention

This invention relates to electrical devices and, more particularly, to novel systems and methods for securing face plates to electrical outlets, switches, or the like.

2. The Background Art

Typically, the structures used to connect a face plate to an electrical fixture (e.g., outlet, switch, etc.) are limited by safety concerns. Specifically, it was believed that the connection between the decorative face plate and the electrical fixture must be of a certain strength to ensure that someone (e.g., a child) could not inadvertently remove the face plate, contact the terminals of the electrical fixture, and receive an electrical shock. This presumes that the fixture has no such protection absent the decorative face plate. It is time to eliminate that presumption.

What is needed is a new apparatus and method for preventing someone from inadvertently contacting the terminals on an electrical fixture, even when no decorative face plate is in place. By so doing, new structures that are more convenient, aesthetically pleasing, and the like may be used to secure a face plate to an electrical fixture. Moreover, new attachment schemes, greater ease of installation, more decorative freedom, and the like may be more readily available under such relaxed structural requirements.

BRIEF SUMMARY OF THE INVENTION

In view of the foregoing, in accordance with the invention as embodied and broadly described herein, a method and apparatus are disclosed in one embodiment of the present invention as including an electrical fixture, having a longitudinal direction, and fasteners for securement within a connection box. Such an electrical fixture may include a main body with a strap or flange extending laterally (e.g., side-to-side) and longitudinally away therefrom. In some embodiments, the flange may form a skirting beyond the side of the fixture, thus limiting access from the front of the electrical fixture to the terminals located on the sides (laterally) or back of the body. Accordingly, when an electrical fixture is secured to a connection box, the skirting may prevent inadvertent contact with the terminals and thereby reduce the risk of electric shock.

In selected embodiments, the skirting of an electrical fixture may have a width in the lateral direction sufficient to cooperate with a wall of the connection box, effectively forming an enclosure that "passes code" without the addition of a face plate. That is, the skirting may extend in the lateral direction an amount sufficient to stop objects of a codified size from being inserted within the connection box to the point where they may contact a terminal. Additionally, the width of the skirting may be selected to permit multiple electrical fixtures to be installed laterally adjacent one another in a multi-gang connection box. The skirting may extend in the longitudinal direction sufficiently to hold (e.g., register) the electrical fixture flush with any wall paneling surrounding the connection box.

In selected embodiments, a flange may include one or more apertures to accommodate the securement of an anchor for connecting the electrical fixture to a connection box. Additional apertures may provide locations for the engagement prongs (e.g., barbs, bayonets, slides, fingers, etc.) of a face plate to engage the flange. For example, face plates in accordance with the present invention may have engagement prongs. The prongs may be inserted through apertures in a corresponding electrical fixture to maintain the face plate aligned securely thereagainst.

In certain embodiments, it may be desirable to use a screwless face plate in accordance with the present invention on a conventional electrical fixture. In such embodiments, an adapter may include the skirting and apertures necessary to interface between a face plate in accordance with the present invention and the conventional electrical fixture. If desired, the fasteners used to secure a conventional electrical fixture to a connection box may also secure the adapter to the conventional electrical fixture. Thus, for example, the adapted, conventional fixture may then include on its front a wide strap for receiving a "new" style of face plate and on its back a quick-connecting anchor.

In selected embodiments, the exterior face of a face plate may have a coating or laminant applied thereto to provide a particular pattern, appearance, style, finish, or the like. For example, in selected embodiments, a thin metal layer may be applied to the exterior face of a face plate. Thus the metal layer is electrically isolated from the fixture. In such embodiments, it may be desired or necessary to ground such metal portions of a face plate. Accordingly, if desired or necessary, an electrical fixture may include a grounding clip in accordance with the present invention.

A grounding clip in accordance with the present invention may be any device that creates a ground path between the metal portion or portions of a face plate and a grounding wire within the connection box. In some embodiments, a grounding clip may engage the skirting of an electrical fixture and extend forward to contact the metal portion or portions of a face plate. A grounding clip may also include a wire lead extending backward toward the interior of the connection box. Accordingly, the wire lead may facilitate connection between the clip and the grounding wire within the connection box.

In certain embodiments, a clear path may be provided between the grounding clip and the metal portion or portions (e.g., covering) of the face plate. For example, in one embodiment, the back surface of a metal covering may be exposed in one or more areas to be positioned transversely (e.g., front or back directions) adjacent certain portions of the skirting. Accordingly, a grounding clip positioned on the skirting may extend in the lateral direction from the body of the electrical fixture to make grounding contact with the metal covering. If desired or necessary, more than one grounding clip may be applied to an electrical fixture. For example, a first grounding clip may ground a first metal portion of a face plate, while a second grounding clip may ground a second metal portion of the face plate.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE ILLUSTRATED EMBODIMENTS

Figure 1:
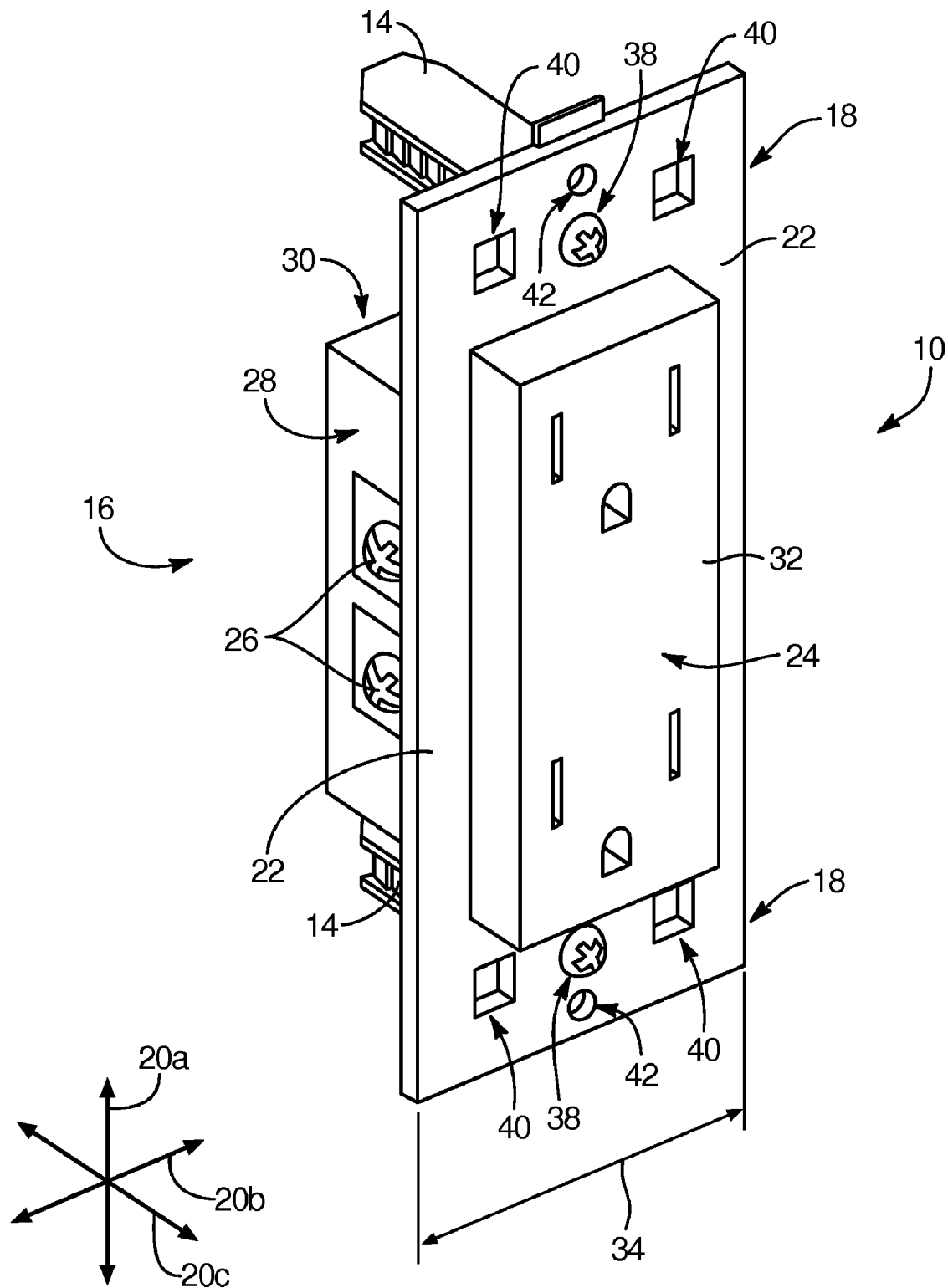
FIG. 1 is a perspective view of one embodiment of an electrical fixture having a wide safety strap in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments in accordance with the invention. The illustrated embodiments of the invention will be best understood by reference to the drawings, wherein like parts are designated by like numerals throughout.

Figure 2:
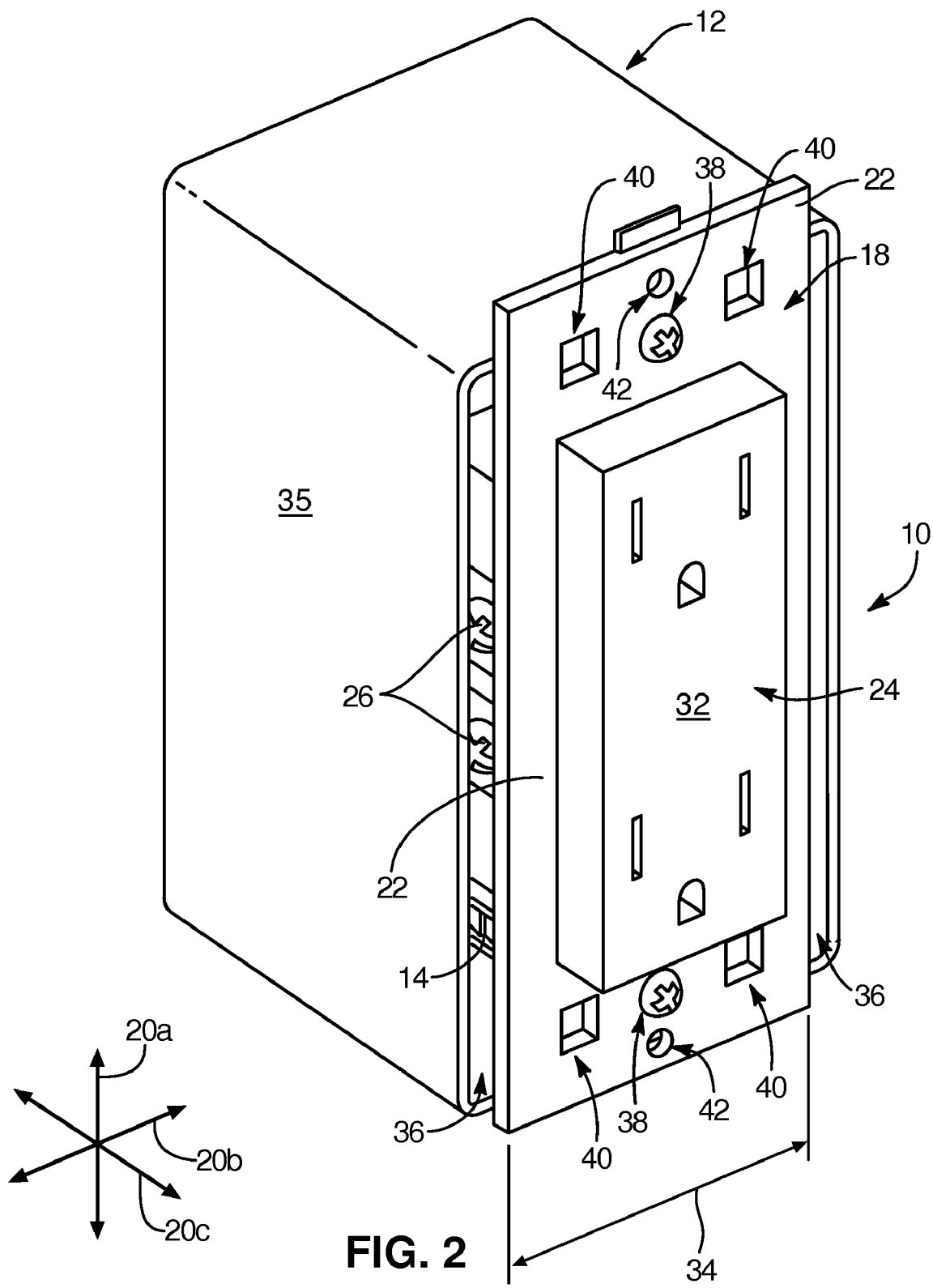
FIG. 2 is a perspective view of the electrical fixture of FIG. 1 applied to a connection box in accordance with the present invention.

Referring to FIGS. 1-2, in selected embodiments in accordance with the present invention, an electrical fixture 10 (e.g., outlet, switch, etc.) may secure to a connection box 12 in any suitable manner. For example, in some embodiments, one or more anchors 14 extending from an electrical fixture 10 may engage one or more receivers formed in a corresponding connection box 12. Such securements are disclosed in U.S. Pat. No. 6,840,800, issued Jan. 11, 2005 and entitled DEFLECTING SECUREMENT ANCHOR FOR ELECTRICAL FIXTURES, which is incorporated herein by reference.

In certain embodiments, electrical fixtures 10 in accordance with the present invention may include a main body 16 with a strap 18 or flange 18 extending away therefrom in longitudinal 20*a* and lateral 20*b* directions. In some embodiments, the flange 18 of an electrical fixture 10 may form a skirting 22 limiting access from the front 24 of the electrical fixture 10 to the terminals 26 located on the sides 28 or back 30 of the body 16. Accordingly, when an electrical fixture 10 is secured to a connection box 12, the skirting 22 may prevent inadvertent contact with the terminals 26 and, thereby, reduce the risk of electric shock.

Skirting 22 in accordance with the present invention may be formed of any suitable materials. Suitable materials may include conductors as well as dielectrics. For example, in one embodiment, the skirting 22 may be formed of a polymer exhibiting dielectric properties. In selected embodiments, the skirting 22 may be monolithically formed (e.g., one piece) or even homogeneously formed (e.g., molded as a single material) with the face 32 of the body 16.

Skirting 22 in accordance with the present invention may have any suitable dimension. For example, in selected embodiments, the skirting 22 may have a width 34 in the lateral direction 20*b* sufficient to cooperate with wall 35 of the connection box 12 in forming an enclosure that "passes code" without the addition of a face plate. That is, the skirting 22 may extend in the lateral direction 20*b* an amount sufficient to stop objects of a codified size from being inserted within the connection box 12 (e.g., within the gap 36 between the skirting 22 and the open face of the connection box 12) to the point where they may contact a terminal 26. Additionally, the width 34 of the skirting 22 may be selected to permit multiple electrical fixtures 10 to be installed laterally 20*b* adjacent one another in a multi-gang connection box 12. In certain embodiments, the skirting 22 may extend in the longitudinal direction 20*a* sufficient to hold the electrical fixture 10 flush with any wall paneling surrounding the connection box 12.

In selected embodiments, a flange 18 may include one or more apertures 38 to accommodate the securement of an anchor 14. Additional apertures 40 may provide locations for the engagement prongs of a face plate 20 to engage the flange 18. Still other apertures 42 in the flange 18 may accommodate screws for securing traditional face plates.

Referring to FIGS. 3-6, in certain applications, screws and other securement devices may be unsightly. In these applications it may be desirable to provide a snap-on face plate 44 to provide fast securement without the use of screws. Face plates 44 in accordance with the present invention may have engagement prongs 46. The prongs 46 may be inserted through apertures 40 in a corresponding electrical fixture 10 to maintain the face plate 44 aligned securely thereagainst.

In selected embodiments in accordance with the present invention, an installer may first connect an electrical fixture 10 to the lines or wires housed in a connection box 12. A face plate 44 may be installed by simply pressing the engagement prongs 46 through the appropriate apertures 40 in the electrical fixture 10. Once an electrical fixture 10 has been connected to the lines and a face plate 44 applied, the electrical fixture 10 may be secured to the connection box 12 by inserting one or more of the attached anchors 14 into corresponding receivers associated with the connection box 12. The anchors 14 may be inserted a selected distance into the receivers until the face plate 44 is properly positioned.

Engagement prongs 46 in accordance with the present invention may be formed to have multiple extensions 48. The extensions 48 may be secured to the face plate 44 by flexible necks 50. A flex clearance 52 may be provided between the extensions 48 so that as the prong 46 is inserted 54 through an aperture 40, the extensions 48 deflect inward 56. Once the prong 46 has passed 58 through the aperture 40, the extensions 48 may substantially resiliently return to their neutral position and engage the edges of the aperture 40.

In selected embodiments, the extensions 48 may be shaped to release at a desired removal loading. Thus, once the face plate 44 is removed, it may be used again. For example, the extensions 48 may be provided with a taper 60. The taper 60 may allow each extension 48 to gradually flex and bend inward 56 into the flex clearance 52 as the face plate 44 is pulled away from the electrical fixture 10. The taper 60 may also tend to bias the engagement prongs 46 into complete engagement with the apertures 40.

Engagement prongs 46 in accordance with the present invention may have any suitable configuration. The number of prongs 46 may range from one to several and be selected to provide a balanced securement between a face plate 44 and an electrical fixture 10. In one embodiment, an engagement prong 46 is positioned within each of the four quadrants of the face plate 44.

The number of extensions 48 making up each prong 46 may also range from one to several (typically two to four), depending on a desired engagement strength, ease of manufacture, ease of installation, ease of removal, and the like. In one embodiment, each prong 46 includes two extensions 48. Prongs 46 may grip inwardly (between) or outwardly against an aperture 40.

A screwless face plate 44 in accordance with the present invention may be formed of any suitable material. Characteristics considered when selecting a material may include, for example, cost, aesthetics, dielectric constant, thermal capacity, strength, toughness, flexibility, formability, and the like. In one embodiment, a face plate 44 with corresponding engagement prongs 46 may be monolithically formed of a polymer.

Figure 7:
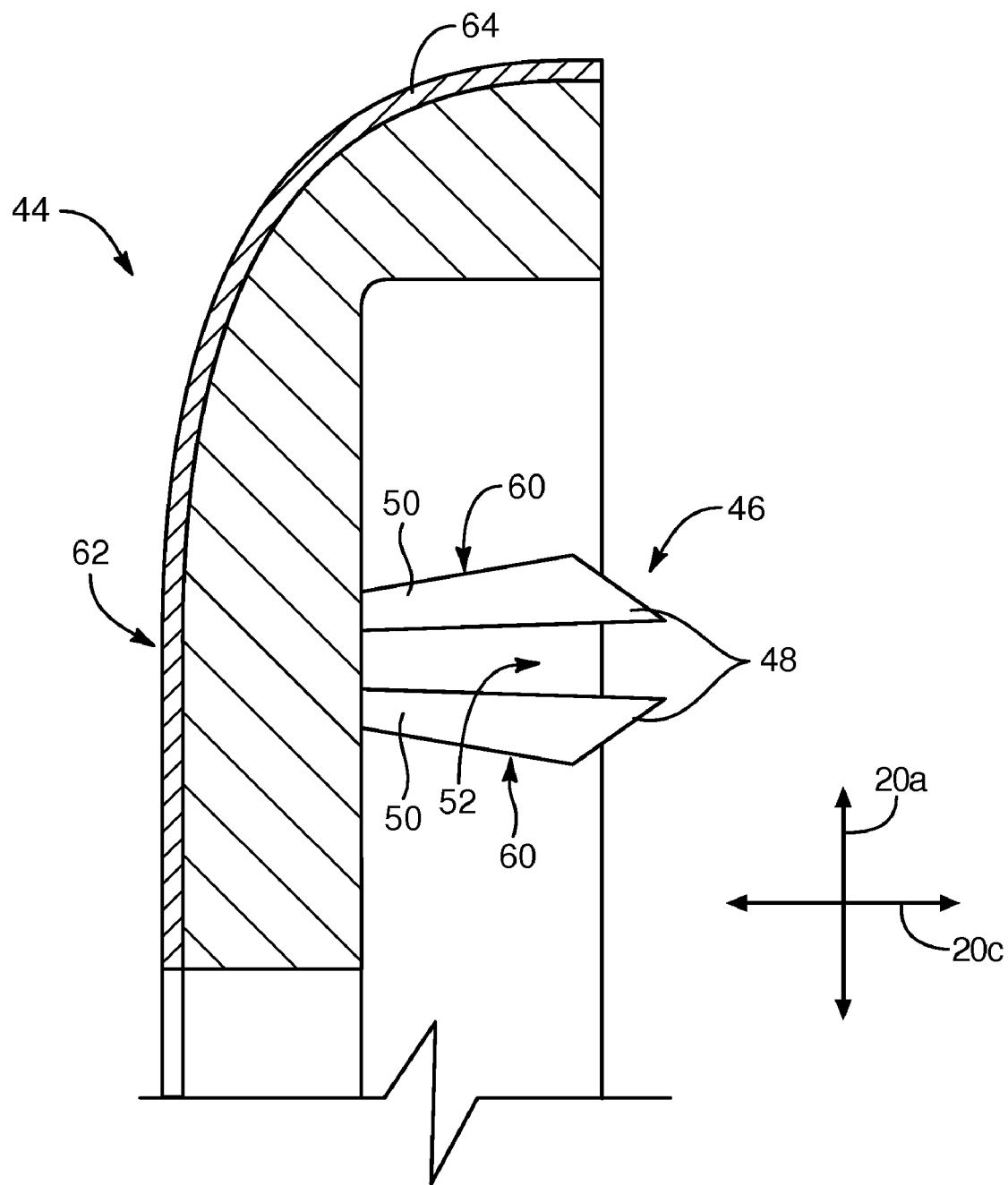
FIG. 7 is a partial, side, cross-sectional view of a face plate laminated with an aesthetic metal covering in accordance with the present invention.

Referring to FIG. 7, in selected embodiments, the exterior face 62 of a face plate 44 may have a coating 64 or laminant 64 applied thereto to provide a particular pattern, appearance, style, finish, or the like. For example, in selected embodiments, a thin metal layer 64 may be applied to the exterior face 62 of a face plate 44. Such a thin metal layer 64, for example, may be formed of brass, brushed brass, nickel, brushed nickel, steel, stainless steel, oxidized iron, tin, aluminum, brushed aluminum, copper, oxidized copper, brushed copper, or the like. In one embodiment, the coating 64 may be applied in a lamination process using an adhesive. Other coating techniques are available.

Figure 3:
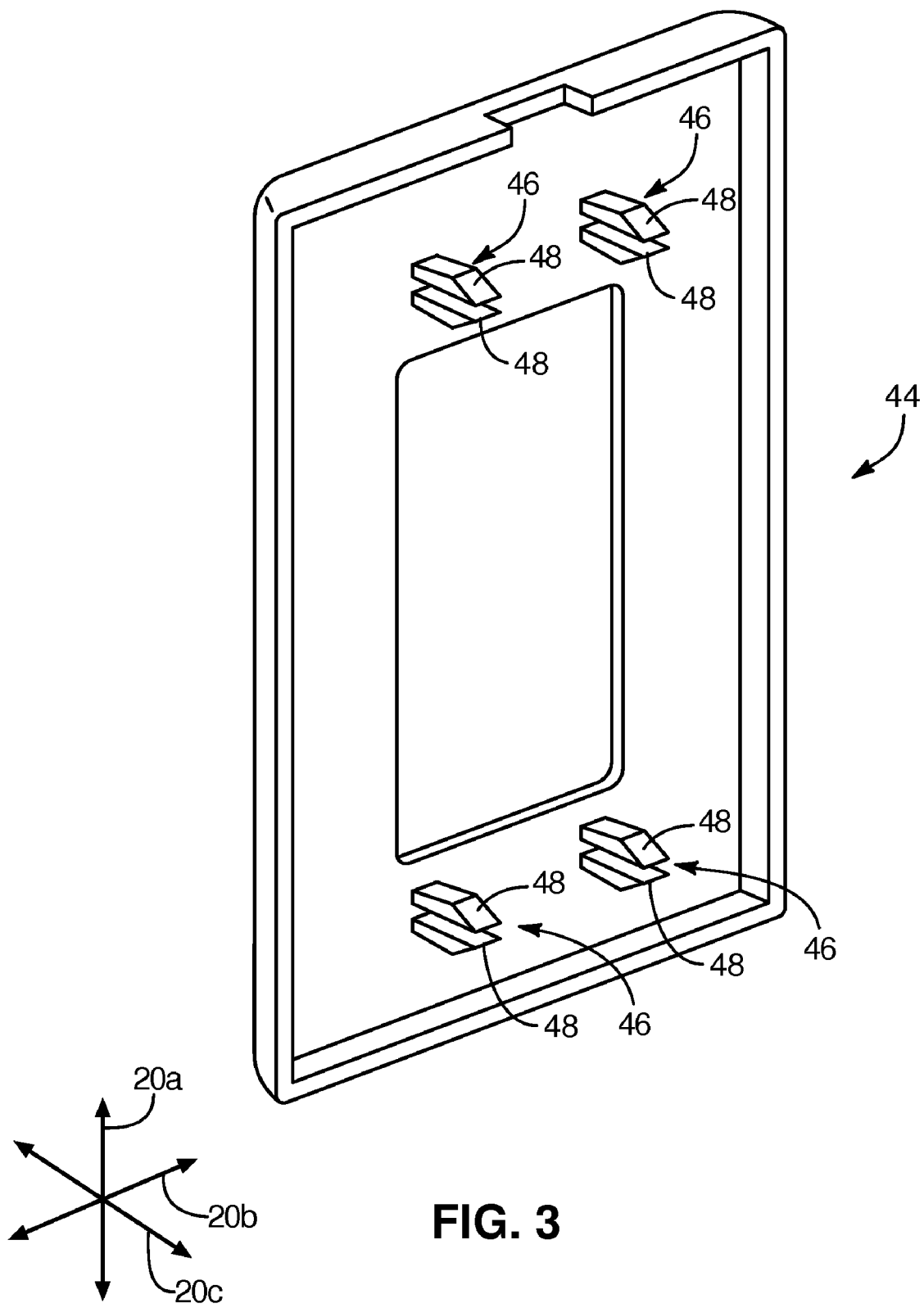
FIG. 3 is a perspective view of one embodiment of a face plate in accordance with the present invention for covering an electrical fixture such as that of FIG. 1.
Figure 4:
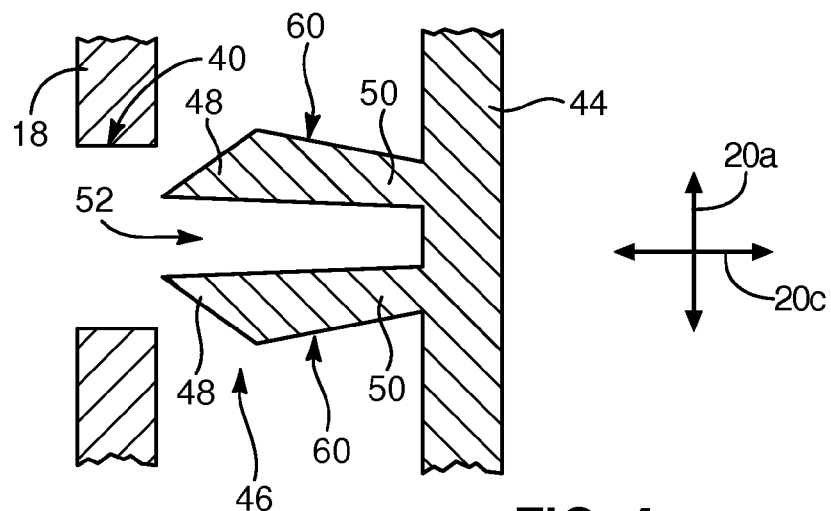
FIG. 4 is a side, cross-sectional view of an engagement prong of a face plate approaching an engagement aperture formed in the flange of a safety strap in accordance with the present invention.
Figure 5:
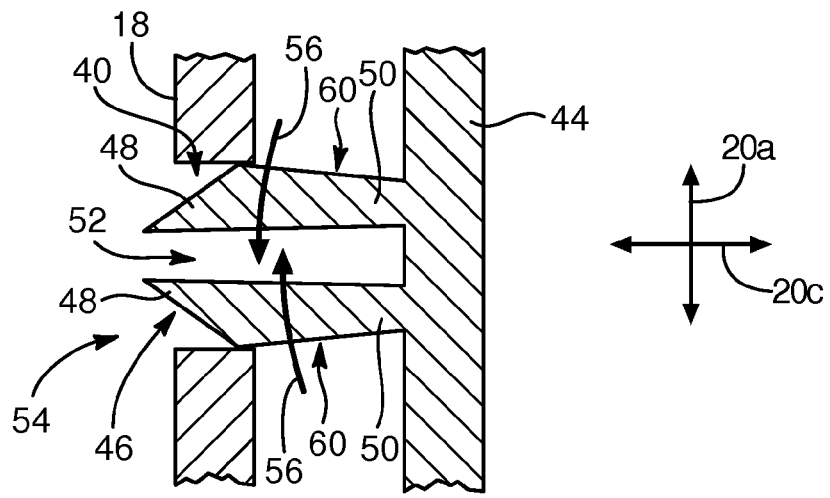
FIG. 5 is a side, cross-sectional view of an engagement prong of a face plate deflecting inward to facilitate insertion thereof into an engagement aperture formed in the flange of a safety strap in accordance with the present invention.
Figure 6:
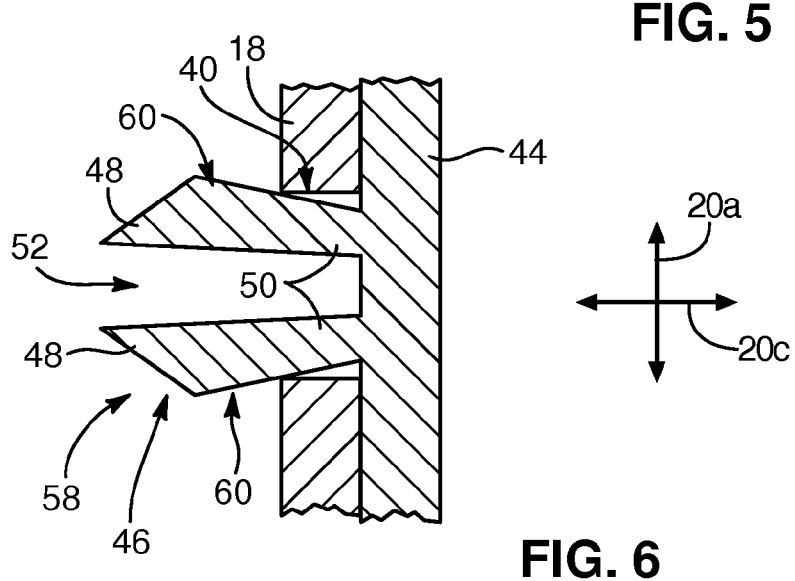
FIG. 6 is a side, cross-sectional view of an engagement prong of a face plate resiliently returned to its original shape once insertion is completed into an engagement aperture formed in the flange of a safety strap in accordance with the present invention.
Figure 8:
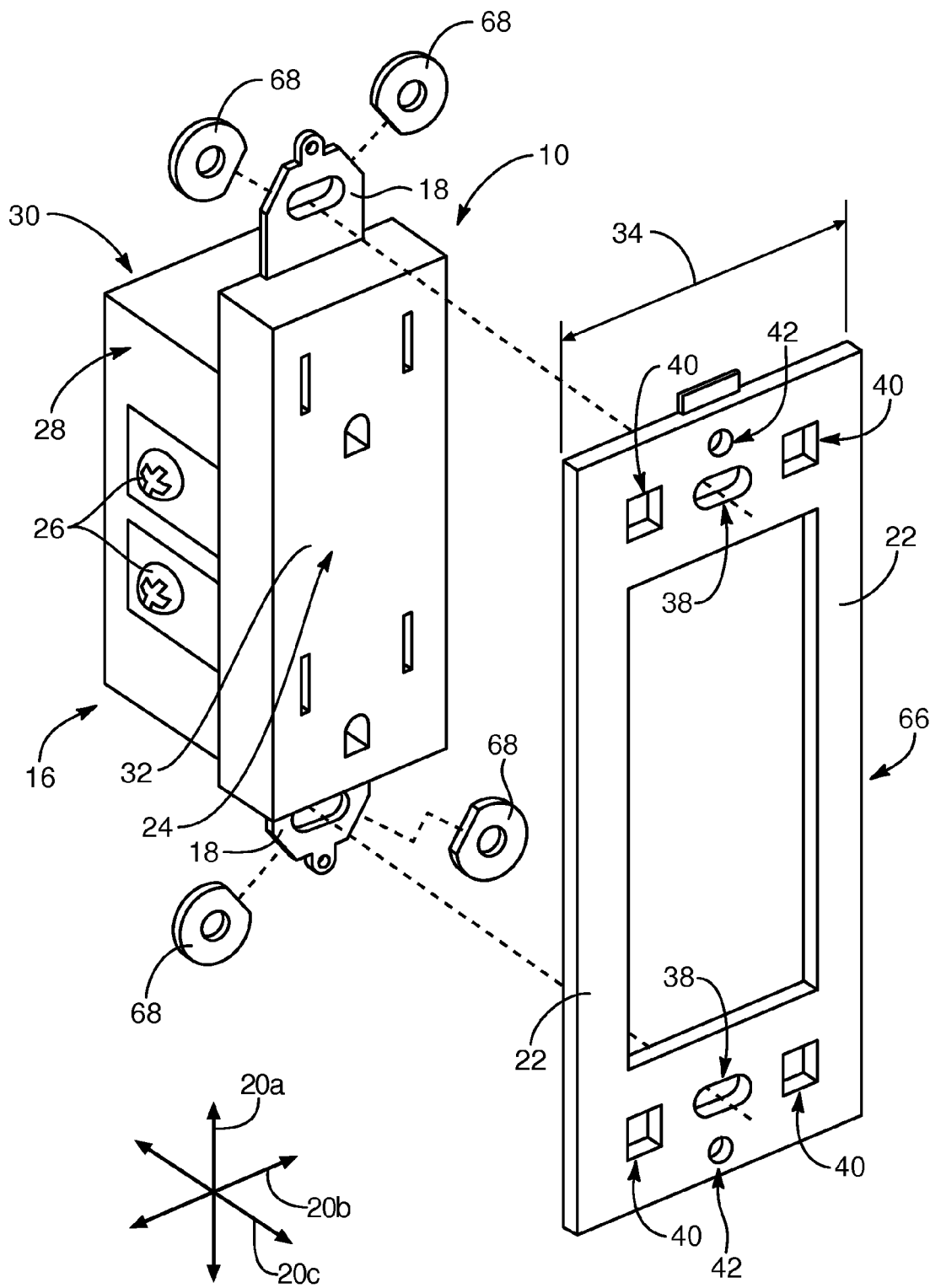
FIG. 8 is a perspective, exploded view of one embodiment of a wide adapter in accordance with the present invention with a corresponding conventional electrical fixture to which the adapter may be retrofit.

Referring to FIG. 8, in selected embodiments, it may be desirable to use a screwless face plate 44 as illustrated in FIG. 3 with a conventional electrical fixture 10. In such embodiments, an adapter 66, formed as a distinct and independent piece, may include the skirting 22 and apertures 38, 40, 42 necessary to interface between the face plate 44 and the conventional electrical fixture 10. The fasteners used to secure a conventional electrical fixture 10 to a connection box 12 may also secure the adapter 66 to the electrical fixture 10. Alternatively, the fasteners used to secure anchors 14 to an electrical fixture 10 may also secure the adapter 66 to the electrical fixture 10.

In certain embodiments, prongs 46, extending through the apertures 40 of an adapter 66, may interfere with the extensions 68 or "rabbit ears" sometimes found on the flanges 18 of conventional electrical fixtures 10. In such embodiments, the extensions 68, typically already scored, may be broken off to provide proper clearance for the prongs 46.

An adapter 66 in accordance with the present invention may be formed of any suitable material. Suitable materials may include conductors as well as dielectrics. For example, in one embodiment, an adapter 66 may be formed of a tough and hard polymer exhibiting certain dielectric properties and suitable for accepting pigmentation and molding in either a smooth satin or glossy finish. The skirting 22 of an adapter 66 may have dimensions (e.g., width 34) as discussed hereinabove.

Figure 9:
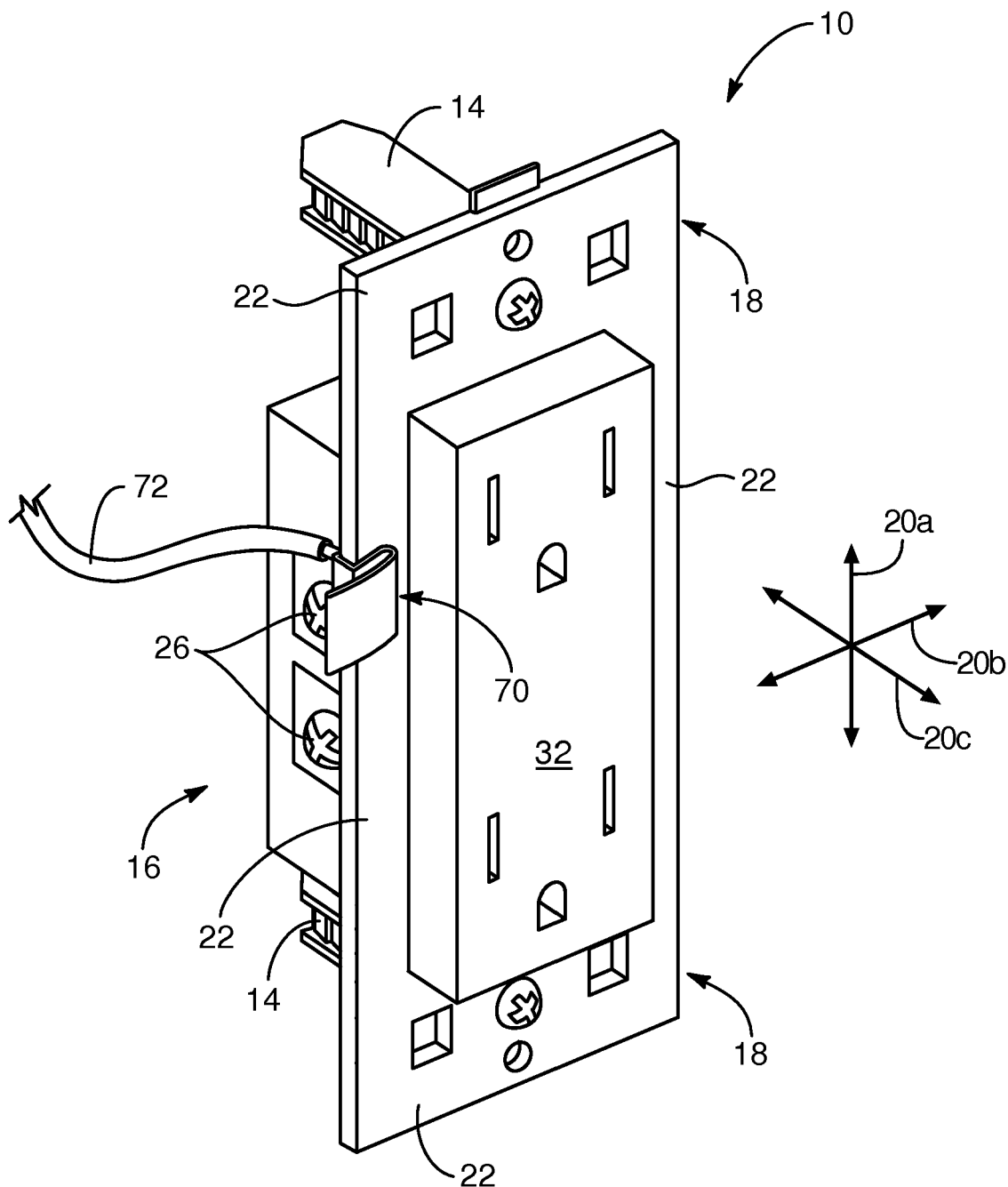
FIG. 9 is a perspective view of the electrical fixture of FIG. 1 with a grounding clip applied thereto for grounding the metal portions of a face plate in accordance with the present invention.
Figure 10:
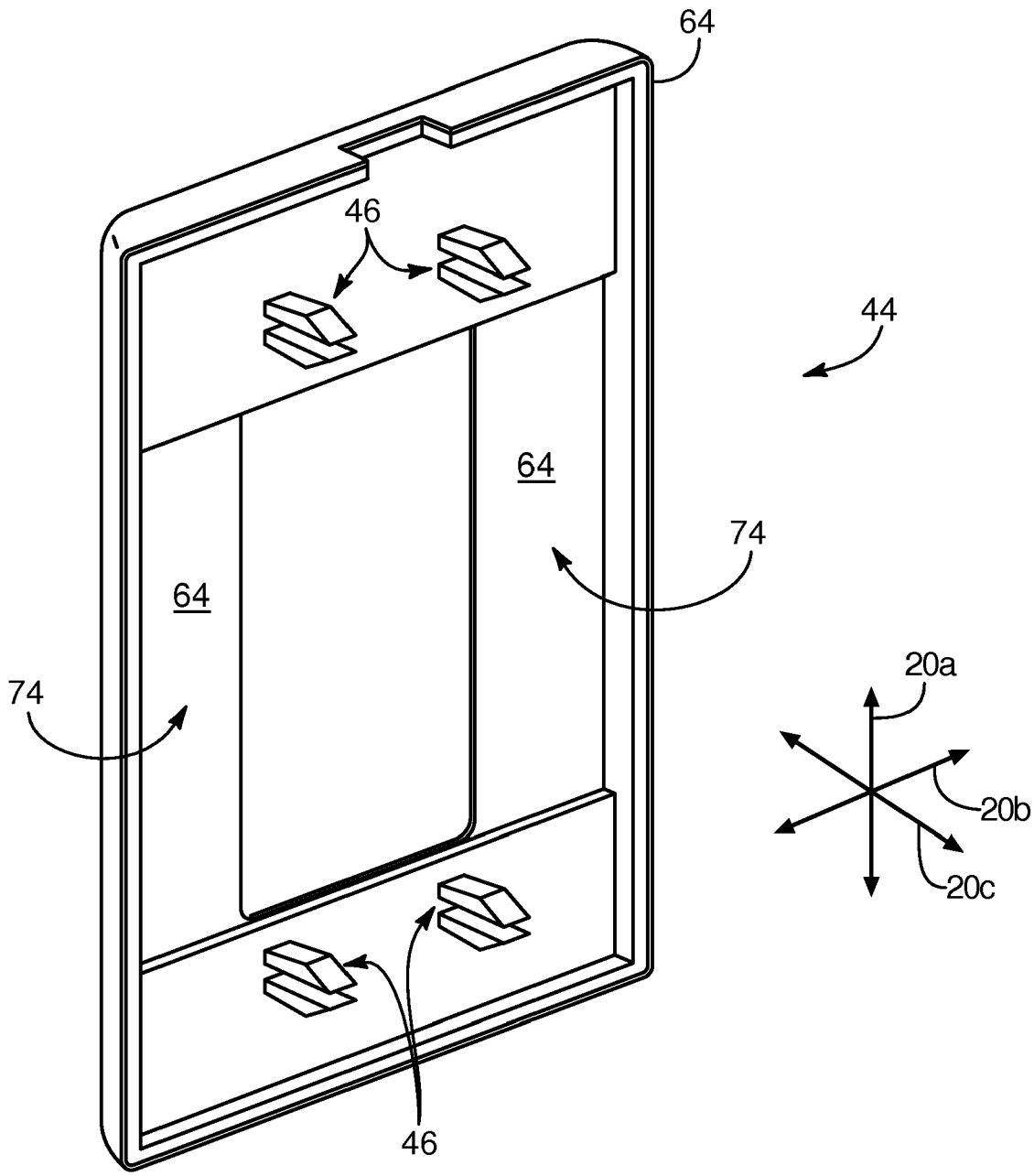
FIG. 10 is a perspective view of a face plate including an aesthetic metal covering and providing exposed portions on the back face of the metal covering to facilitate contact by a grounding clip in accordance with the present invention.

Referring to FIGS. 9 and 10, in certain embodiments, it may be desired or necessary to ground the metal portions of a face plate 44. For example, in selected embodiments, a face plate 44 may have a metal covering 64. Accordingly, building regulations or codes may require that such a metal covering 64 be grounded. Alternatively, the entire face plate 44 may be formed of metal and require grounding.

In traditional installations, the one or more screws used to secure a face plate to the electrical fixture provided a grounding path. That is, metal screws typically formed an electrical connection between a metal face plate and the metal flange or interior of the electrical fixture. This metal flange or interior could then be grounded by a ground wire within the connection box 12.

However, in embodiments in accordance with the present invention, the flange 18 may often be formed of a dielectric material. Prongs 46 extending from a face plate 44 to engage such a flange 18 may be formed of a dielectric material and not provide a grounding path. Moreover, screws (conductive or otherwise) cannot ground a metal face plate (or the metal portions of a face plate) to a flange 18 formed of a dielectric material. Accordingly, in selected embodiments in accordance with the present invention, an electrical fixture 10 may include a grounding clip 70. A grounding clip 70 may be any device that creates a ground path between the metal portion or portions of a face plate 44 and a grounding wire within the connection box 12.

In some embodiments, a grounding clip 70 may engage the skirting 22 of an electrical fixture 10 and extend forward to contact the metal portion or portions of a face plate 44. In selected embodiments, a clip 70 may include a wire lead 72 extending backward toward the interior of the connection box 12. Accordingly, the wire lead 72 may facilitate connection between the clip 70 and the grounding wire within the connection box 12. For example, in certain embodiments, the wire lead 72 may extend a length sufficient to facilitate an engagement with the grounding wire within the connection box 12 using a twist-on wire connector. In other embodiments, the wire lead 72 may be omitted. In such embodiments, the grounding wire within the connection box 12 may extend to contact and engage the clip 70 directly.

In certain embodiments, a clear path may be provided between the grounding clip 70 and the metal portion or portions (e.g., covering 64) of the face plate 44. For example, in one embodiment, the back surface 74 of a metal covering 64 may be exposed in the areas to be positioned transversely 20c adjacent the portions of the skirting 22 extending in the lateral direction 20b from the body 16 of the electrical fixture 10. So arranged, a grounding clip 70 positioned anywhere along the skirting 22 extending in the lateral direction 20b from the body 16 of the electrical fixture 10 may make grounding contact with the metal covering 64.

Figure 11:
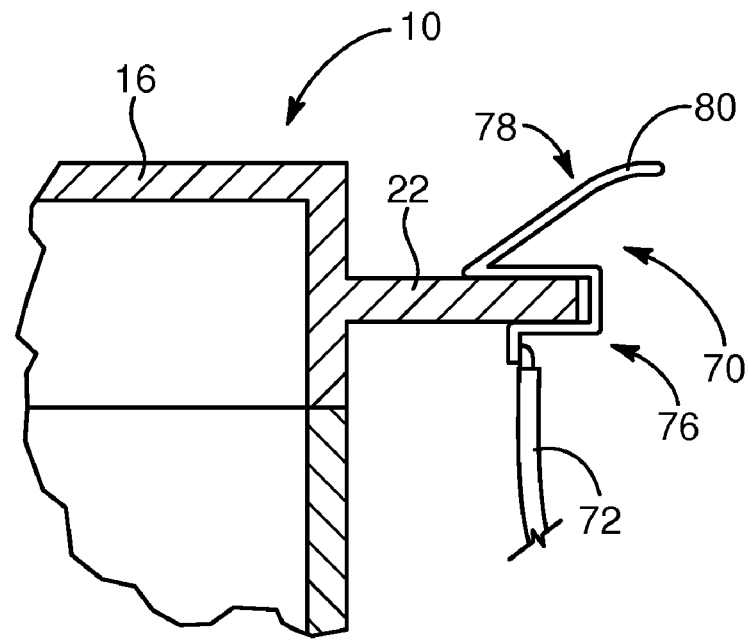
FIG. 11 is a partial, end, cross-sectional view of grounding clip applied to an electrical fixture in accordance with the present invention.
Figure 12:
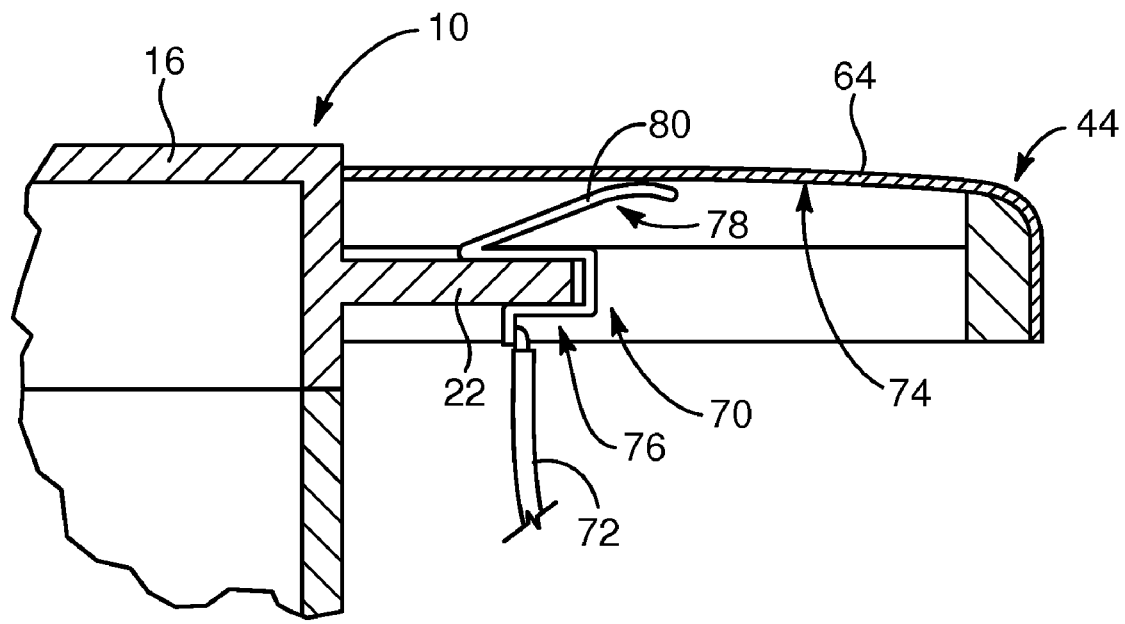
FIG. 12 is a partial, end, cross-sectional view of the grounding clip and electrical fixture of FIG. 11 with the face plate of FIG. 10 applied thereto in accordance with the present invention.

Referring to FIGS. 11 and 12, in selected embodiments, a grounding clip 70 may include an engagement portion 76 and a contact portion 78. The engagement portion 76 may be primarily responsible for securing the clip 70 to the electrical fixture 10 (e.g., to the skirting 22 of the electrical fixture 10). In certain embodiments, the engagement portion 76 may be configured as a spring loaded clamp formed of a conductive material (e.g., thin sheet metal). In such an arrangement, the engagement portion 76 may rely on the resiliency of the conductive material to provide the force necessary to squeeze or grip the skirting 22 therewithin. In some embodiments, the wire lead 72 may extend from one side of the engagement portion 76 while the contact portion 78 extends from the other.

The contact portion 78 of a grounding clip 70 may include an extension 80 or cantilever 80 extending to providing grounding contact with the metal portions of the face plate 44. In selected embodiments, the resiliency of the conductive material forming the contact portion 78 may provide the force necessary to bias the extension 80 or cantilever 80 against the metal covering 64 or other metal portions of the face plate 44. Accordingly, the contact portion 78 may provided adequate grounding contact with face plates 44 of varying dimension or configuration.

Figure 13:
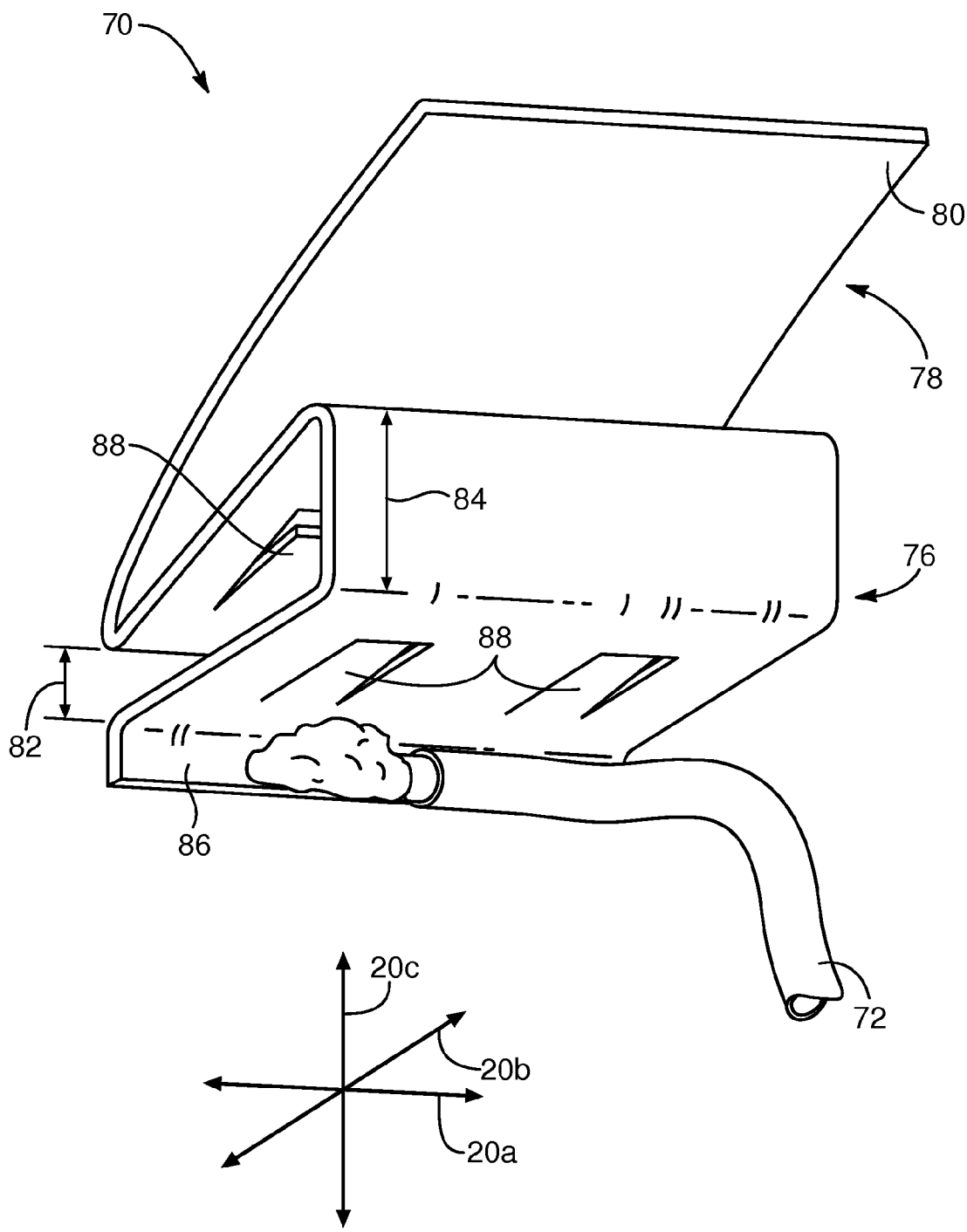
FIG. 13 is a perspective view of one embodiment of a grounding clip with barbs for resisting removal in accordance with the present invention.

Referring to FIG. 13, in selected embodiments, a grounding clip 70 may be formed of a continuous section of thin sheet metal bent as necessary to form the engagement portion 76 and the contact portion 78. If desired or necessary, in a neutral position, the mouth of the engagement portion 76 may have an opening height 82 less than the height 84 at the back of the engagement portion 78. Once installed, this bias may improve the ability of the engagement portion 76 to squeeze or grip the electrical fixture 10 in the transverse direction 20c.

A lead wire 72 may secure to a grounding clip 70 in any suitable manner. For example, in selected embodiments, the engagement portion 76 of the grounding clip 70 may include a lip 86 extending in substantially the transverse direction 20c. The lip 86 may facilitate application of the clip 70 to the electrical fixture 10. Additionally, the lip 86 may provide a location for securing the wire lead 72. In some embodiments, the lip 86 may provide a location to solder the wire lead 72 to the clip 70. In other embodiments, a lip 86 may provide the material necessary for crimping the wire lead 72 to the clip 70. Alternatively, the lip 86 may provide a location for securing the grounding wire extending from within the connection box 12. If desired or necessary, the lip 86 may be omitted. In such embodiments, the wire lead 72 or grounding wire extending from within the connection box 12 may connect to the grounding clip 70 at some other location.

In certain embodiments, a grounding clip 70 may be configured to resist removal after installation. For example, in some embodiments, the engagement portion 76 of a grounding clip 70 may include one or more barbs 88. Such barbs 88 may permit the engagement portion 76 to be advanced unto the electrical fixture 10, yet bite into the electrical fixture 10 to resist a removal force. In selected embodiments, the one or more barbs 88 may be formed in a stamping process where an inwardly directed cantilever is cut from the base material of the engagement portion 76.

Figure 14:
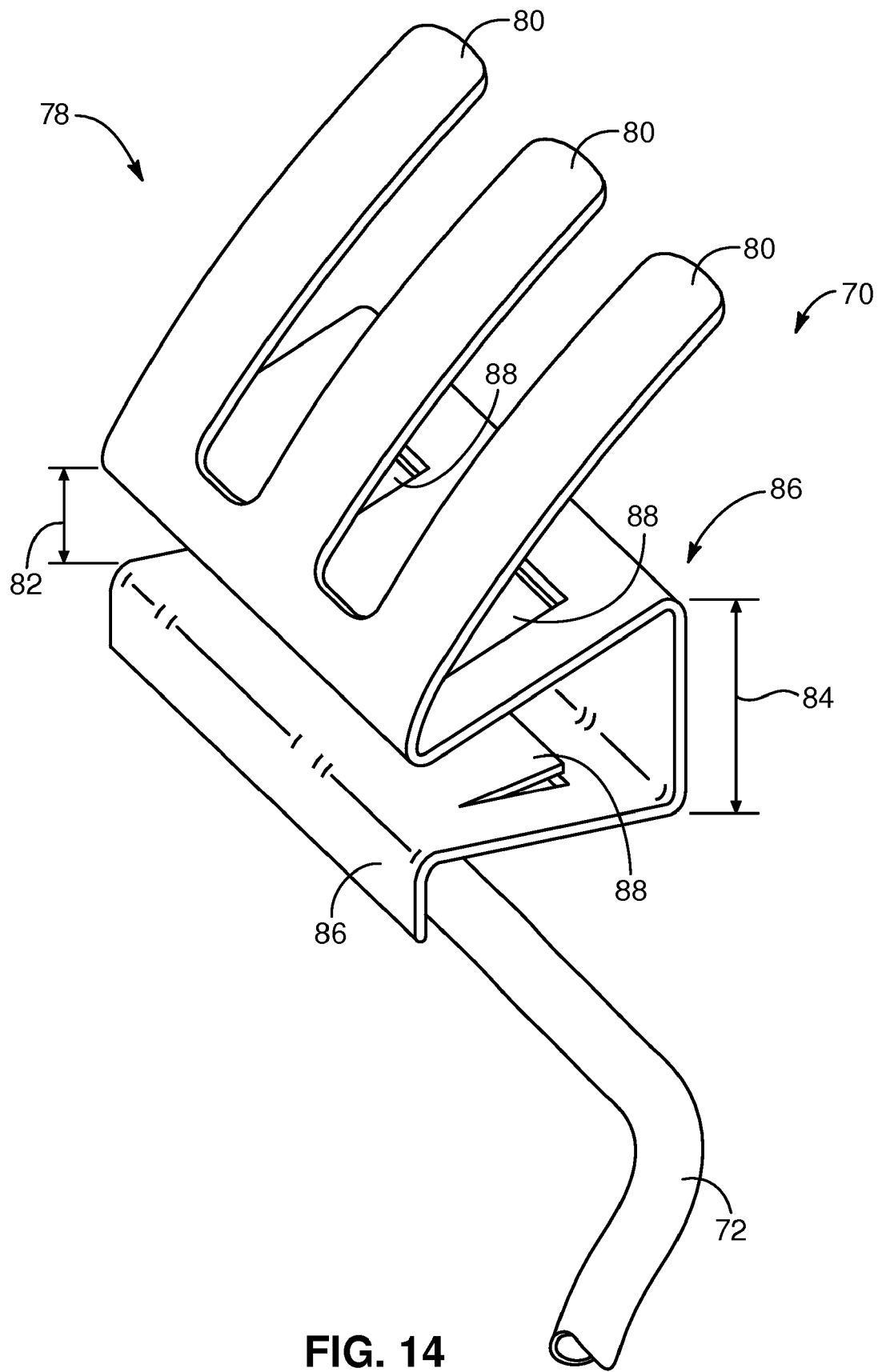
FIG. 14 is a perspective view of one embodiment of a grounding clip with multiple extensions in accordance with the present invention.

Referring to FIG. 14, in selected embodiments, the contact portion 78 of a grounding clip 70 may be formed to include more than one extension 80 or cantilever 80 extending to providing grounding contact with the metal portions of the face plate 44. The different extensions 80 may extend to contact different metal portions of the face plate 44. Alternatively, the different extensions may increase the likelihood that at least one adequate grounding contact will be formed. That is, an obstacle or irregularity stopping one extension 80 from making proper contact should not stop the other extensions 80 from making contact. Accordingly, the grounding clip 70 may continue to perform its intended function.

If desired or necessary, more than one grounding clip 70 may be applied to an electrical fixture 10. For example, a first grounding clip 70 may ground a first metal portion of a face plate 44, while a second grounding clip 70 may ground a second metal portion of the face plate 44.

Figure 15:
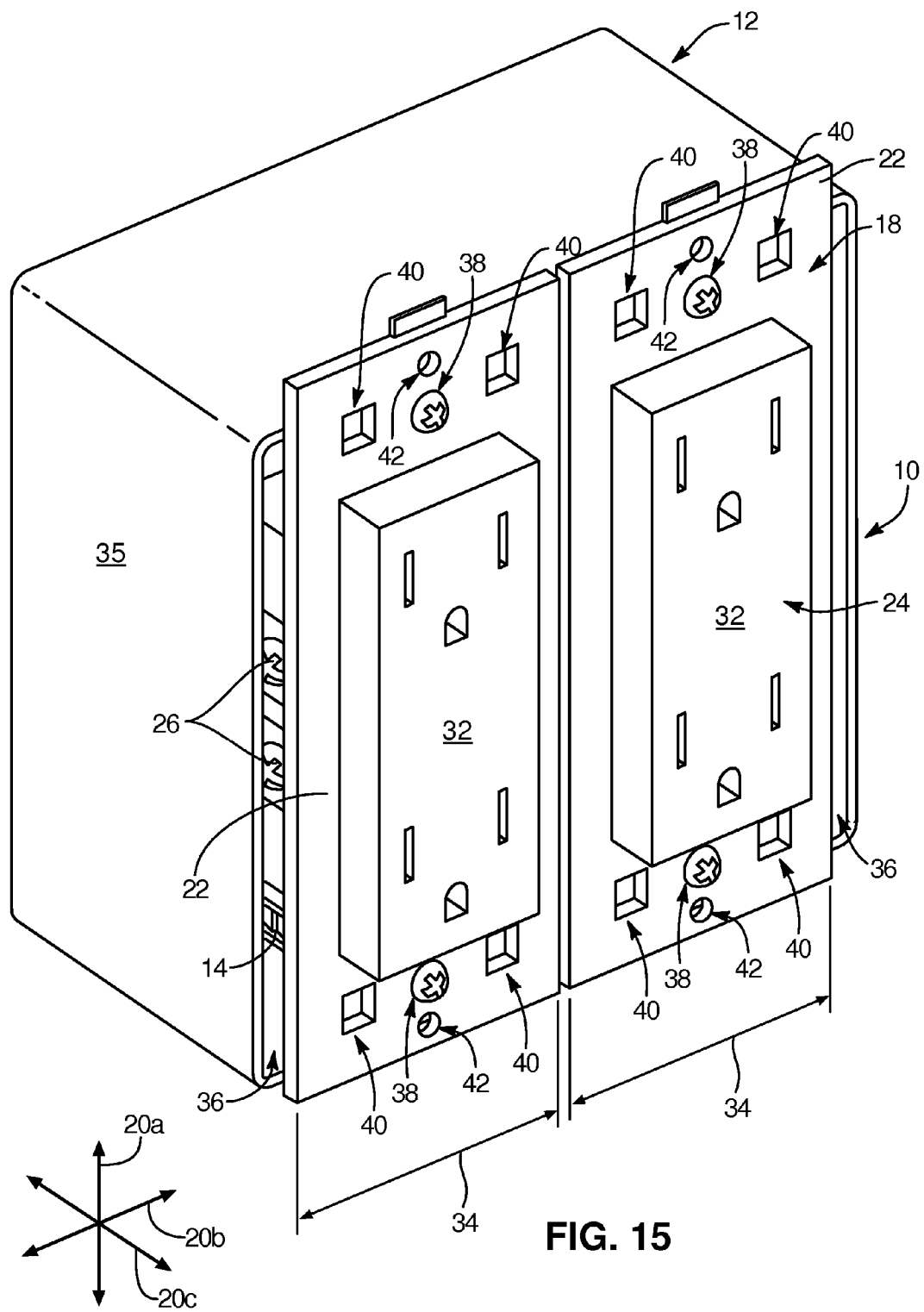
FIG. 15 is a perspective view of two electrical fixtures having a wide safety strap in accordance with the present invention positioned within a multi-gang connection box.

Referring to FIG. 15, as noted hereinabove, in selected embodiments, the skirting 22 may extend in the lateral direction 20b an amount sufficient to stop objects of a codified size from being inserted within the connection box 12 (e.g., within the gap 36 between the skirting 22 and the open face of the connection box 12) to the point where they may contact a terminal 26. Additionally, the width 34 of the skirting 22 may be selected to permit multiple electrical fixtures 10 to be installed laterally 20b adjacent one another in a multi-gang connection box 12. In certain embodiments, the skirting 22 may extend in the longitudinal direction 20a sufficiently to hold the electrical fixture 10 flush with any wall paneling surrounding the connection box 12.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An assembly defining longitudinal, lateral, and transverse directions substantially orthogonal to one another, the assembly comprising:
   a connection box;
   a face plate having a plurality of engagement prongs extending therefrom, the face plate comprising an electrical conductor; and
   an electrical fixture having an exterior and comprising
      a body having at least one terminal extending to the exterior of the electrical fixture,
      a flange extending in the longitudinal and lateral directions from the body and having a dividing plane extending in the longitudinal and transverse directions, the dividing plane dividing the flange into two portions, the flange further comprising a plurality of engagement apertures, each receiving an engagement prong of the plurality of engagement prongs, at least one engagement aperture of the plurality of engagement apertures extending in the transverse direction through the flange within each of the two portions at a location spaced from the dividing plane, each engagement aperture of the plurality of engagement apertures comprising a rectangular perimeter, the flange having a dimension in the lateral direction supporting installation of the electrical fixture in both single gang and multi-gang connection boxes, and at least one anchor transversely extending from the flange and directly engaging the connection box.

2. The assembly of claim 1, wherein the two portions are substantially mirror images of one another.

3. The assembly of claim 1, wherein the anchor comprises a threaded fastener passing through the flange.

4. The assembly of claim 3, wherein the plurality of engagement apertures comprises four engagement apertures.

5. The assembly of claim 4, wherein the flange is formed as a continuous, homogeneous unit.

6. The assembly of claim 5, wherein the flange is formed of a dielectric material.

7. The assembly of claim 6, wherein:

the body further comprises a front portion corresponding to a front surface and a back portion corresponding to a back surface; and the back portion comprises the at least one terminal.

8. The assembly of claim 7, wherein the flange is formed as a monolithic extension of the front portion.

9. The assembly of claim 8, wherein the face plate comprises four engagement prongs, each comprising a plurality of extensions and engaging an engagement aperture of the plurality of engagement apertures.

10. The assembly of claim 1, further comprising a grounding clip engaging the flange and extending from the flange to contact the electrical conductor.

11. The assembly of claim 1, wherein the plurality of engagement apertures comprises four engagement apertures.

12. The assembly of claim 1, wherein the flange is formed as a continuous, homogeneous unit.

13. The assembly of claim 1, wherein the flange is formed of a dielectric material.

14. The assembly of claim 1, wherein:

the body further comprises a front portion corresponding to a front side and a back portion corresponding to a back side;

the back portion comprises the at least one terminal; and the flange is formed as a monolithic extension of the front portion.

15. The assembly of claim 1, wherein the face plate comprises four engagement prongs, each comprising a plurality of extensions and engaging an engagement aperture of the plurality of engagement apertures.

16. An electrical fixture defining longitudinal, lateral, and transverse directions substantially orthogonal to one another, the electrical fixture comprising:

a face plate comprising an electrical conductor;

a body having at least one terminal;

a flange extending in the longitudinal and lateral directions from the body and having a dividing plane extending in the longitudinal and transverse directions, the dividing plane dividing the flange into two portions;

the flange further comprising a plurality of engagement apertures positioned and sized to engage the face plate, at least one engagement aperture thereof extending in the transverse direction through the flange within each of the two portions at a location spaced from the dividing plane, each engagement aperture of the plurality of engagement apertures comprising a rectangular perimeter;

the flange having a dimension in the lateral direction supporting installation of the electrical fixture in both single gang and multi-gang connection boxes;

a grounding clip engaging the flange and extending from the flange to contact the electrical conductor; and at least one anchor transversely extending from the flange to directly engage a connection box.

* * * * *